(12) United States Patent
Zhang (10) Patent No.: US 7,637,018 B2
(45) Date of Patent: Dec. 29, 2009

(54) POWER TOOL

(75) Inventor: Shisong Zhang, Suzhou (CN)

(73) Assignee: Positec Power Tools (Suzhou) Co. Ltd., Suzhou (CH)

( * ) Notice: Subject to any disclaimer, the term of this patent is extended or adjusted under 35 U.S.C. 154(b) by 500 days.

(21) Appl. No.: 11/541,813

(22) Filed: Oct. 2, 2006

(65) Prior Publication Data

US 2007/0074408 A1    Apr. 5, 2007

(30) Foreign Application Priority Data

Sep. 30, 2005    (CN)    ................ 2005 1 0094719

(51) Int. Cl.
*B23D 49/04*    (2006.01)
(52) U.S. Cl. ................ 30/392; 30/393; 74/60
(58) Field of Classification Search ............ 30/392, 30/393, 394; 74/58, 60; 173/205
See application file for complete search history.

(56) References Cited

U.S. PATENT DOCUMENTS

| | | | | |
|---|---|---|---|---|
| 5,025,562 A * | 6/1991 | Palm | ............ | 30/392 |
| 5,555,626 A | 9/1996 | Fuchs | | |
| 6,286,217 B1 | 9/2001 | Dassoulas et al. | | |
| 6,508,151 B1 * | 1/2003 | Neitzell | ............ | 83/34 |
| 6,634,107 B2 * | 10/2003 | Osada | ............ | 30/392 |
| 6,829,831 B1 * | 12/2004 | Neitzell | ............ | 30/393 |
| 2001/0034941 A1 * | 11/2001 | Bednar et al. | ............ | 30/392 |
| 2005/0193571 A1 | 9/2005 | Hai-Chun | | |

FOREIGN PATENT DOCUMENTS

DE    19648972 A1    5/1997

* cited by examiner

*Primary Examiner*—Hwei-Siu C Payer
(74) *Attorney, Agent, or Firm*—Laurence A. Greenberg; Werner H. Stemer; Ralph E. Locher (57) ABSTRACT

A power tool includes a housing, a rotary motor disposed in the housing, a jack shaft coupled to the motor and a spindle mounted in the housing for carrying a tool. A first wobble plate assembly is coupled to the jack shaft for driving the spindle to reciprocate at least approximately linearly in a linear path along a predetermined axis. A counterweight is mounted in the housing for performing a rotative reciprocating motion and pivoting relative to the housing about a pivot axis. The pivot axis is disposed in a plane perpendicular to the predetermined axis and fixed relative to the housing. A second wobble plate assembly is coupled to the jack shaft for driving the counterweight. The use of the counterweight results in no friction or restriction with a large stroke and large area, so that stability is improved, fitting of the counterweight is simple and cost is reduced.

21 Claims, 6 Drawing Sheets

POWER TOOL

CROSS-REFERENCE TO RELATED APPLICATION

This application claims the priority, under 35 U.S.C. §119, of Chinese Patent Application 2005 10 094 719.7, filed Sep. 30, 2005; the prior application is herewith incorporated by reference in its entirety.

BACKGROUND OF THE INVENTION

Field of the Invention

The present invention relates to a power tool, in particular to a wobble plate reciprocating saw. The power tool includes a housing, a rotary motor disposed in the housing, a jackshaft coupled to the rotary motor, a spindle mounted in the housing for carrying a tool, a first wobble plate assembly mounted on or coupled to the jackshaft so as to drive the spindle to reciprocate at least approximately linearly in a linear path along a predetermined axis, a counterweight mounted in the housing for performing a reciprocating motion relative to the housing, and a second wobble plate assembly mounted on or coupled to the jackshaft so as to drive the counterweight.

Known wobble plate reciprocating saws have a guide sleeve, a spindle sleeved in the guide sleeve, a first wobble plate assembly driving the spindle, a counterweight sleeved on the guide sleeve, and a second wobble plate assembly driving the counterweight. U.S. Pat. No. 5,025,562 discloses such a wobble plate reciprocating saw in which the counterweight is disposed on the guide sleeve and the spindle is disposed in the guide sleeve. The movement path of the counterweight is parallel to or coincident with the movement path of the spindle. In that conventional saw, there are a large number of fitting surfaces and frictional areas. The fitting surfaces need precision work so that there is a need to assemble the parts accurately, which results in heavy manufacturing costs. Large frictional areas also lead to the development of heat.

SUMMARY OF THE INVENTION

It is accordingly an object of the invention to provide a power tool, which overcomes the hereinafore-mentioned disadvantages of the heretofore-known devices of this general type, which is effective, but which has less frictional areas.

With the foregoing and other objects in view there is provided, in accordance with the invention, a power tool, comprising a housing, a rotary motor disposed in the housing, a jackshaft coupled to the rotary motor, and a spindle mounted in the housing for carrying a tool. A first wobble plate assembly is mounted on or coupled to the jackshaft for driving the spindle to reciprocate at least approximately linearly in a linear path along a predetermined axis. A counterweight is mounted in the housing for performing a reciprocating motion relative to the housing. The counterweight is pivotable relative to the housing about a pivot axis, to perform the reciprocating motion as a rotative reciprocating motion. The pivot axis is disposed in a plane perpendicular to the predetermined axis and fixed relative to the housing. A second wobble plate assembly is mounted on or coupled to the jackshaft for driving the counterweight.

The present invention advantageously exploits a counterweight pivotally connected to the housing in such a way that there is basically no friction with a large stroke and large area. If a guide sleeve should be applied to guide the spindle, the counterweight does not impede the guide sleeve during its motion towards and away from the front end of the tool. Nevertheless, due to the counterweight, the tool is basically vibration-free. This improves the stability of the tool, and assembling the counterweight and the guide sleeve is a straightforward, low cost procedure.

According to an embodiment of the invention, there is provided a power tool including a housing, a rotary motor, a jackshaft coupled to the motor, a spindle and a counterweight. A biangular driving member may be mounted radially on the jackshaft and may cooperate with a first wobble plate assembly to reciprocatingly linearly drive the spindle, and a second wobble plate assembly to reciprocatingly drive the counterweight. The counterweight is pivotally connected to the housing. The second wobble plate assembly drives the counterweight to swing back and forth relative to the housing about the pivot so that the swing path of the counterweight may intersect with the linear path of the spindle or may swing in a plane parallel to or containing the longitudinal axis of the spindle.

The power tool may include a guide sleeve sleeved on the spindle, in such a way that the spindle is slideable in the sleeve. The counterweight may swing past such a guide sleeve. The spindle may include a front component on which a blade is mounted, and a rear component connected to the front component. A first slot may be formed in and extend longitudinally along the guide sleeve. An opposing projecting portion may be defined on the rear component. The projecting portion may slide in the first slot along the longitudinal axis of the spindle. A second slot may be formed in and extend longitudinally along the guide sleeve. A socket and a cavity may be formed in the rear component. The first wobble plate assembly may include a first wobble arm passing through the second slot and the cavity to be received in the socket.

Preferably, the counterweight may include a U-shaped body. The U-shaped body may have two mass bodies of the same weight and the same configuration. The guide sleeve may be received in the U-shaped body.

The side arms of the U-shaped body may swivel at a very short distance from the sleeve. Thus, the rotative movement of the counterweight is not impeded by the guide sleeve. The counterweight may include a stirrup which surrounds or receives the second wobble plate assembly. The counterweight may be provided with a pin rotatably connected to the housing. The counterweight may pivotally rotate relative to the housing with the driving of the second wobble plate assembly. The angle between the first wobble plate assembly and the second wobble plate assembly may be zero.

The first wobble plate assembly may include a first bearing directly or indirectly mounted radially on the jackshaft. The first bearing may extend radially outwardly into a first wobble arm. The first wobble arm may operatively engage the spindle. The first wobble arm may terminate in a spherical tip.

The second wobble plate assembly may include a second bearing directly or indirectly mounted on the jackshaft. The second bearing may extend radially outwardly into a second wobble arm. The second wobble arm may terminate in a spherical tip. The first wobble arm and the second wobble arm may be in a common axial plane, i.e. at substantially the same angle when viewed along the axis of the spindle.

A biangular driving member may be mounted radially on the jackshaft and may cooperate with the first wobble plate assembly to linearly drive the spindle reciprocatingly and with the second wobble plate assembly to linearly drive the counterweight reciprocatingly. The biangular sleeve is typically stepped. The biangular sleeve may have a first angular part and a second angular part. The first angular part and the second angular part may respectively engage the first bearing and the second bearing and may be adapted to cause the first wobble arm and the second wobble arm to be driven reciprocatingly (particularly preferably to be driven reciprocatingly 180° out-of-phase and to reverse at the same instant).

Preferably, the counterweight includes a U-shaped body in which the guide sleeve is received axially. The U-shaped body may include a first arm, a second arm and a transverse connecting base connecting the first and second arms in a spaced apart relationship. The first arm and the second arm may be parallel. The first arm and the second arm may be upright. A receiving bore or cavity in the connecting base may receive the tip of the second wobble arm.

Preferably, the counterweight includes a stirrup (e.g. a substantially square-shaped stirrup) which surrounds the second wobble plate assembly. The stirrup may extend from the transverse connecting base. The base of the stirrup may be concave.

Preferably, the counterweight is pivotally mounted on a first transverse pin and on a second transverse pin in such a way that the second wobble arm drives the counterweight to pivotally rotate relative to the housing. The first transverse pin and the second transverse pin may be provided on the housing or on the counterweight (preferably on the stirrup). In this embodiment, there is an opposing element respectively disposed on the counterweight or on the housing to respectively engage the first and the second transverse pin. Preferably, the first transverse pin and the second transverse pin are provided on a peripheral face of the stirrup near a lower edge.

The center of mass of the counterweight is preferably positioned away from the point of engagement of the second wobble arm with the counterweight (e.g. the receiving bore in the transverse connecting base).

Preferably, the angle between the first wobble plate assembly and the second wobble plate assembly is zero, as mentioned above.

According to a preferred embodiment of all of the aspects of the invention, the power tool of the invention is a reciprocating saw, such as a saber saw. Of course, the invention may also be used in a plurality of other tools for making them largely free of vibrations during operation.

Other features which are considered as characteristic for the invention are set forth in the appended claims.

Although the invention is illustrated and described herein as embodied in a power tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
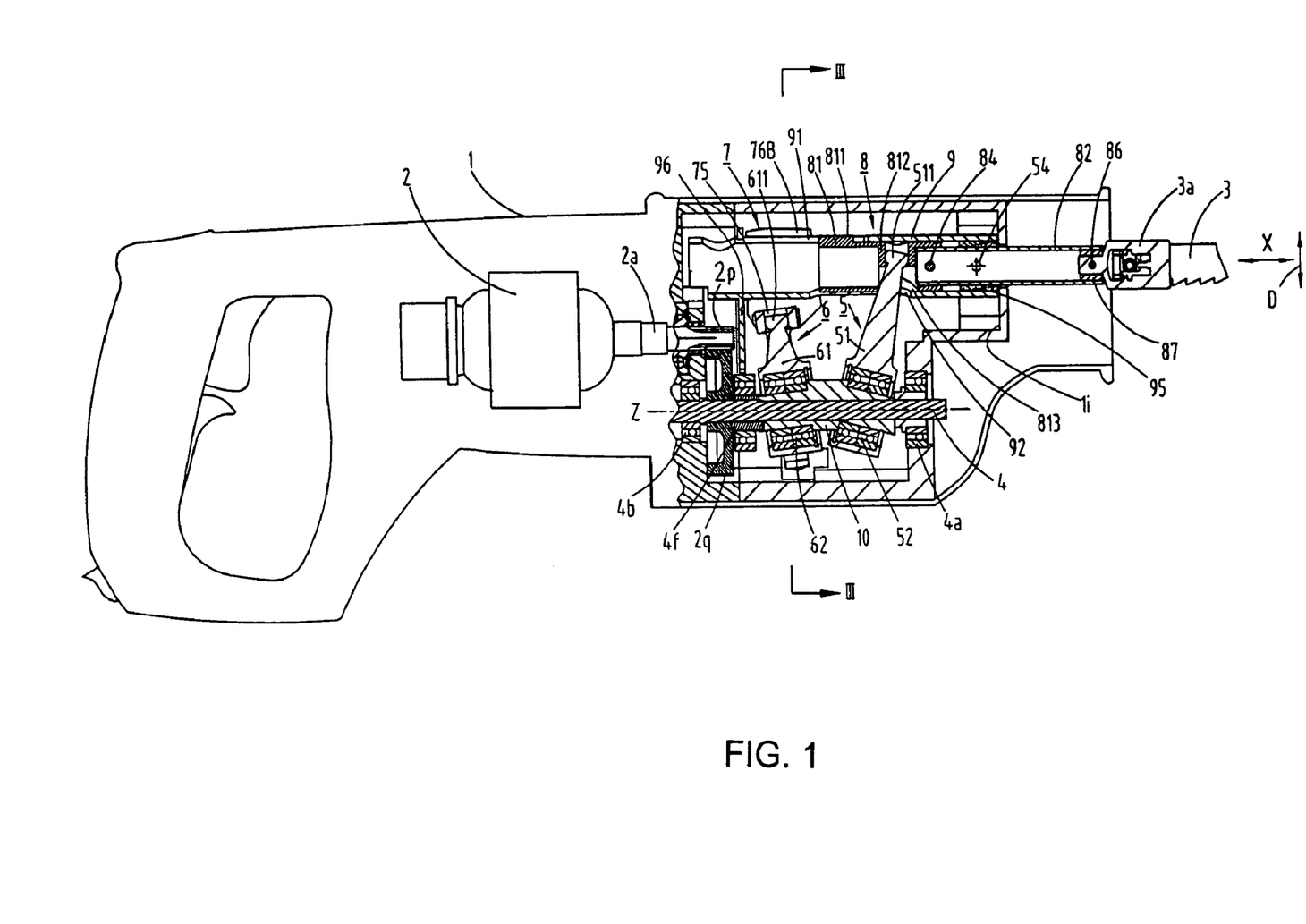
FIG. 1 is a diagrammatic, partly broken-away, side-elevational view of an embodiment of a reciprocating saw according to the invention, in which a first wobble plate assembly is in its first position and a second wobble plate assembly is in its first position.
Figures 2, 2A:
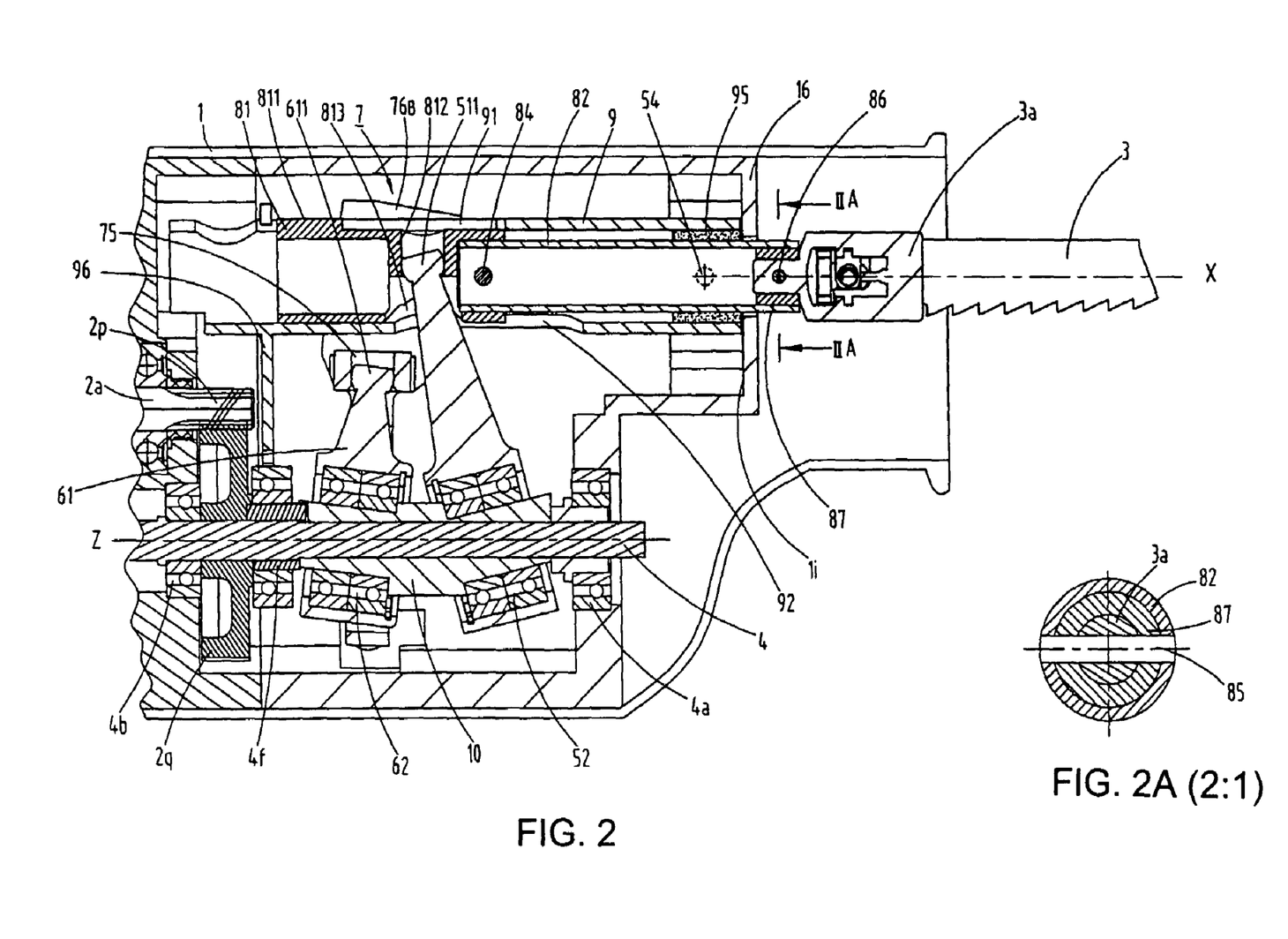
FIG. 2 is an enlarged, partly broken-away, side-elevational view of the embodiment of the reciprocating saw according to FIG. 1, in which the first wobble plate assembly is in its second position and the second wobble plate assembly is in its second position.
FIG. 2A is a further enlarged, sectional view taken along a line IIA-IIA of FIG. 2, in the direction of the arrows.

Referring now to the figures of the drawings in detail and first, particularly, to FIGS. 1 and 2 thereof, there is seen an embodiment of a reciprocating saw incorporating the invention. The saw is basically vibration-free. The saw generally includes a housing 1 and (within the housing 1) a rotary motor 2 having an output shaft 2a which is provided with a pinion 2p. The pinion 2p engages a larger gear or wheel 2q, which is coupled to a jackshaft 4 having a shaft axis Z. The jackshaft 4 is supported in the housing 1 by bearings 4a and 4b.

An eccentric cam 4f and a biangular wobble drive member 10 are radially mounted between the bearings 4a, 4b. The cam 4f rotates along with the gear 2q and the jackshaft 4 when the motor 2 is in operation. The cam 4f is basically an eccentric tube. A protrusion (not denoted by a reference symbol) is provided on the right side of the eccentric cam 4f. The protrusion meshes with a slot in the left end face of the wobble drive member 10.

Figure 3:
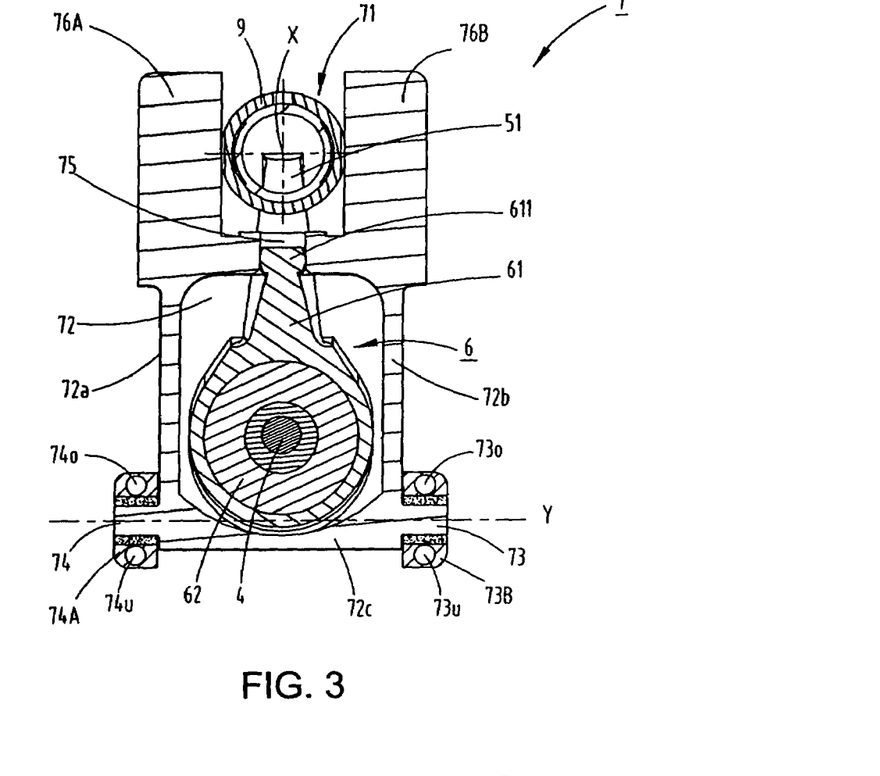
FIG. 3 is a further enlarged, sectional view of the first and second wobble plate assemblies taken approximately along a line III-III of FIG. 1, in the direction of the arrows, perpendicular to an axis of a spindle.
Figure 4:
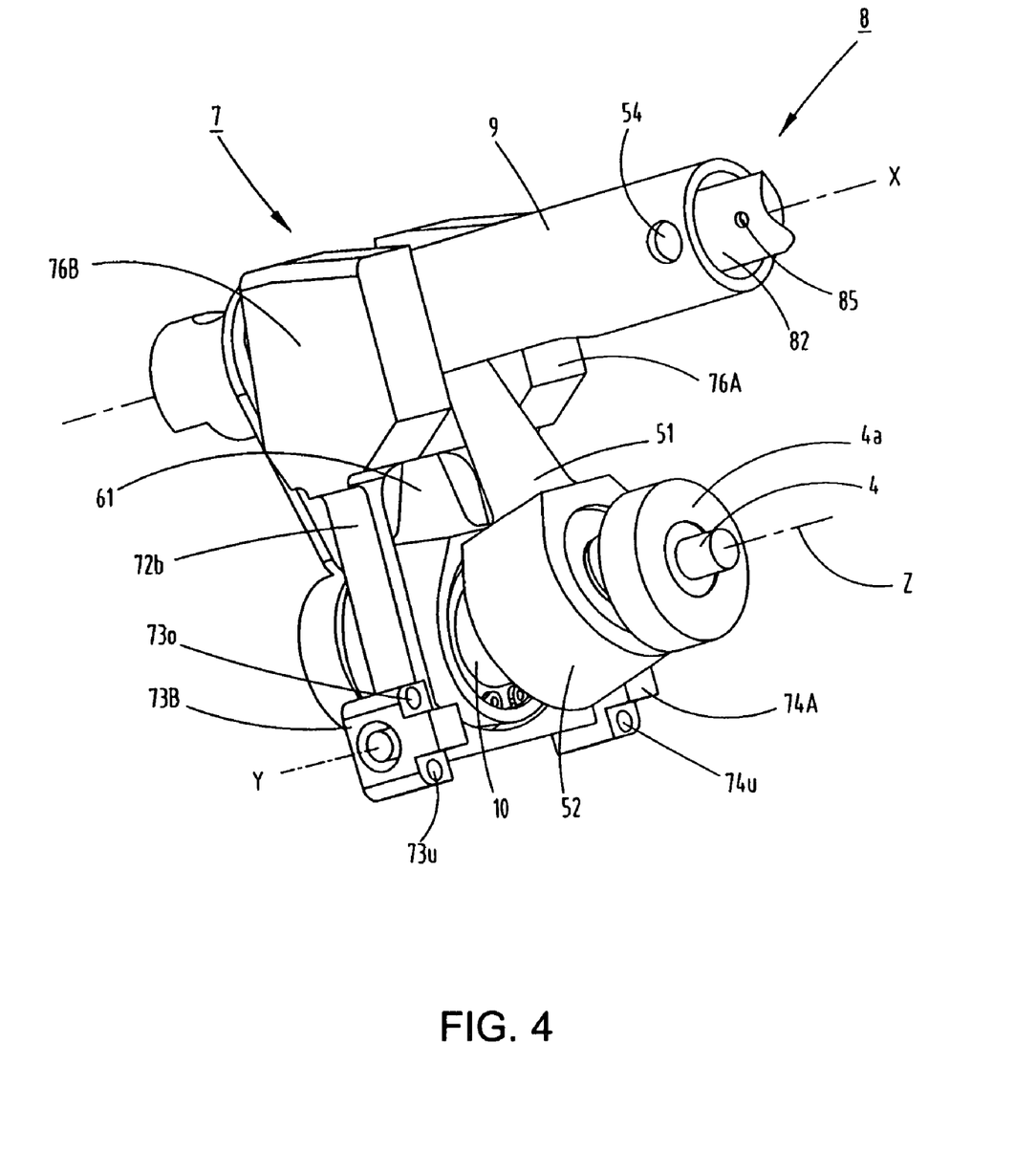
FIG. 4 is a perspective view of a spindle and a counterweight of the embodiment of the invention shown in FIGS. 1-3.
Figure 5:
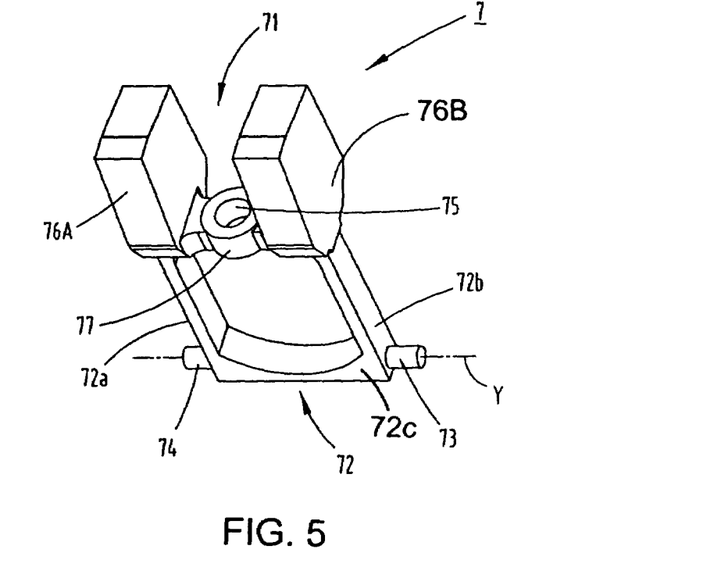
FIG. 5 is a perspective view of the counterweight of the embodiment of the invention shown in FIGS. 1-4.

The wobble drive member 10 cooperates with a first wobble plate assembly 5 to reciprocatingly drive a spindle 8 and with a second wobble plate assembly 6 to reciprocatingly drive a counterweight 7 about a pivotal axis Y (which can be seen in FIGS. 3-5).

A guide sleeve 9 is also accommodated in the housing 1. The spindle 8 is slideably mounted in the guide sleeve 9. A bearing 9s disposed internally at the front end of the guide sleeve 9 supports the spindle 8. The longitudinal direction of the spindle 8 and of the guide sleeve 9 is denoted by reference symbol X.

The spindle 8 includes a tubular rear portion or component 81 and a tubular front portion or component 82. In the illustrated embodiment, the front component 82 has a slightly smaller diameter than the rear component 81. The front component 82 has a back end fastened inside the rear component 81 through the use of a pin 84. The entire spindle 8 is movable in the direction X relative to the housing 1. This can be seen by comparing FIG. 1 with FIG. 2. A clamping system 3a which is attached on the front end of the spindle 8 holds a longitudinal saw blade 3 as a tool. Thus, the direction X may be considered as a working axis. A pin 86 and a ring 87 are used for attachment.

As mentioned above, the spindle 8 is slideably disposed in the tubular guide sleeve 9. An end face of the guide sleeve 9 is attached to an internal wall 1*i* of the housing 1. Therefore, the guide sleeve 9 cannot move in the direction X. However, a pin 55 seen in FIG. 6A is inserted into a hole 54 in the guide sleeve 9. Thus, the guide sleeve 9 can swivel very slightly about the axis of the pin 55. In other words, the guide sleeve 9 in this case is pivotally attached to the housing 1. The small up-and-down pivoting movement of the guide sleeve 9 is indicated by a double arrow D in FIG. 1.

Referring to FIGS. 1 and 2, it is seen that the front component 82 extends into the rear component 81. A first slot 91 and a second slot 92 extend longitudinally along the guide sleeve 9. The slots 91, 92 are disposed on opposite sides of the guide sleeve 9. As can be seen in FIG. 2, a substantially rectangular projection 811 projects radially from the surface of the rear component 81 and is slideably engaged in the first slot 91 along the axis of the spindle 8. The longitudinal length of the projection 811 is smaller than the longitudinal length of the first slot 91. A tubular extension or socket 812 and a cavity 813 are defined in the interior of the rear component 81 of the spindle 8. The socket 812 and the cavity 813 have a common axis which is perpendicular to the axis of the spindle 8. The diameter of the socket 812 is smaller than that of the cavity 813.

As a result of this construction, the spindle 8 can be moved longitudinally between the two ends of the first slot 91.

The first wobble plate assembly 5 includes a first bearing 52 mounted radially on the biangular wobble drive member 10. The first wobble plate assembly 5 additionally includes a first wobble arm 51 mounted on the first bearing 52. The first wobble arm 51 terminates in a spherical tip 511. The tip 511 of the first wobble arm 51 passes through the second slot 92 and through the cavity 813 and is received in the socket 812. The length of the second slot 92 is chosen correspondingly to allow a sufficient movement of the first wobble arm 51.

The second wobble plate assembly 6 includes a second bearing 62 mounted radially on the biangular wobble drive member 10. The second bearing 62 supports a second wobble arm 61, which is similar to the first arm 51. The second wobble arm 61 terminates in a spherical tip 611. It may be seen that the second wobble arm 61 is shorter than the first wobble arm 51. The tip 611 of the second wobble arm 61 is received in a cavity 75 of the counterweight 7, as is best seen in FIG. 3. The first wobble arm 51 and the second wobble arm 61 are in a common axial plane, i.e. they are at the same angle when viewed along the axis X of the spindle 8, as is also seen in FIG. 3. The spindle 8 and the counterweight 7 thereby reverse at the same point in time. Of course, the reversal is in opposite directions.

The eccentric cam 4*f*, which was already mentioned above, transmits the torque of the jackshaft 4 (i.e. the rotation of the gear 2*q*) to the wobble drive member 10. The eccentric cam 4*f* is connected to a driving plate 96 which is mounted on the guide sleeve 9. When the eccentric cam 4*f* rotates to drive the driving plate 96 into an up and down movement, the guide sleeve 9 moves and thus causes the spindle 8 and the blade 3 to move up and down slightly, as is indicated by the double arrow D. This improves the speed and quality of the sawing process.

The rotary motor 2 drives the jackshaft 4 to rotate, thereby causing the biangular wobble drive member 10 to rotate. The biangular wobble drive member 10 has a first angular part and a second angular part which respectively engage the first bearing 52 and the second bearing 62 and which are adapted to cause the first wobble arm 51 and the second wobble arm 61 to be driven reciprocatingly 180° out-of-phase and to reverse at the same instant (see FIGS. 6, 7 and 8). When the first wobble arm 51 and the spindle 8 move to their first position illustrated in FIG. 1, the second wobble arm 61 and the counterweight 7 move oppositely to their first position. When the first wobble arm 51 and the spindle 8 move from their first position illustrated in FIG. 1 to their second position within a U-shaped body 71 illustrated in FIGS. 3-5, the second wobble arm 61 and the counterweight 7 move oppositely to their second position.

FIGS. 3-5 illustrate that the counterweight 7 driven by the second wobble plate assembly 6 may be considered as a swing mechanism, as opposed to a mechanism carrying out linear reciprocating movements. The swing or pivot axis Y is defined on the counterweight 7.

Referring to FIGS. 3-5, it is seen that the counterweight 7 includes a U-shaped body 71 and a frame-like receiving member or stirrup 72 which extends from the U-shaped body 71. The U-shaped body 71 includes a first mass body 76A, a second mass body 76B and a transverse connecting base 77 which interconnects the first and second mass bodies 74A, 76B in a spaced apart relationship. The guide sleeve 9 extends axially through the space between the mass bodies 76A, 76B. A receiving bore or burrow hole 75 for receiving the tip 611 of the second wobble arm 61 is formed in the connecting member 77. The tip 611 can be rotated in the hole 75.

The stirrup 72, which has a substantially square configuration, extends from the bottom of the U-shaped mass body 71. This stirrup 72 receives or surrounds the second wobble plate assembly 6. The stirrup 72 includes the connecting base 77, a first side arm or side post 72*a*, a second side arm or side post 72*b*, which is parallel to and spaced apart from the first side arm 71*a*, and a connecting member 72*c*.

A first transverse pin 73 and a second transverse pin 74 are formed on the peripheral face of the stirrup 72 near the lower edges of the side arms 72*a*, 72*b*. The pins 73, 74 are mounted coaxially and rotatably with the housing 1 to define the pivot axis Y substantially perpendicular to the longitudinal axis X of the spindle 8. Thus, they form a pivot about which the counterweight 7 swings during operation. Alternately, the first pin 73 and the second pin 74 can be provided on the housing 1, and corresponding holes may be disposed in the counterweight 7, so that in this case the counterweight 7 is also pivotally connected to the housing 1.

It must be stressed that the pivotal axis Y is fixed (i.e. not movable) with respect to the housing 1.

As was already mentioned, the pivot axis Y of the counterweight 7 is substantially perpendicular to the longitudinal axis X of the spindle 8. That is: the pivot axis Y is located in a plane perpendicular to the longitudinal axis X and is offset with regard to a non-illustrated axis which extends directly and perpendicularly through the longitudinal axis X. During operation, the second wobble arm 61 drives the counterweight 7 to swing back and forth relative to the housing 1 about the pivot axis Y. This reciprocating motion occurs in such a way that the swing path of the counterweight 7 intersects the linear path of the spindle 8. The counterweight 7 pivots in (or alternately parallel to) a plane containing the longitudinal axis X of the spindle 8.

The first pin 73 is disposed in a bearing seat 73B, which is provided with a bearing, such as a powder bearing that is not illustrated in FIG. 4 for the sake of clarity. The bearing seat 73B is attached to the housing 1. A lower attachment hole 73*u* and an upper attachment hole 73*o* are provided for this purpose. Similarly, the second pin 74 is disposed in a bearing seat 74A, which is provided with a bearing that may again be a powder bearing. Correspondingly, there are provided holes 74*u* and 74*o* for fixing the bearing seat 74A on the housing 1.

FIG. 4 shows a side hole 85 for the pin 86 in the front component 82 of the spindle 8, as well as the side hole 54 for the pin 55. The pin 55 is illustrated in FIG. 6A, as mentioned above.

According to FIG. 6A, the guide sleeve 9 is provided with pinholes 54 on both sides. A pin 55 having a pinhead 55H is inserted into each pinhole 54. The pinheads 55H each have an outside thread. Each pinhead 55H can thereby be screwed into a channel 56 in each of two respective walls 1a, 1b of the housing 1. The pins 55 prevent a movement of the sleeve 9 in the direction X. Yet, the sleeve 9 can slightly pivot about the longitudinal axis of the pins 55 (see the double arrow D in FIG. 1).

During operation, the motor 2 drives the jackshaft 4 into rotation, and the jackshaft 4 drives the driving member 10 mounted on the jackshaft 4 into rotation. As a consequence, the driving member 10 drives the first wobble plate assembly 5 and the second wobble plate assembly 6 into movement. While the first wobble arm 51 along with the spindle 8 move to the position illustrated in FIG. 1, the second wobble arm 61 and the counterweight 7 move in the opposite direction. Finally, the first wobble plate assembly 5 and the spindle 8 driven by it are in their first position, and the second wobble plate assembly 6 and the counterweight 7 driven by it are in their first position. When the first wobble arm 51 and the spindle 8 subsequently move from the first position illustrated in FIG. 1 towards the second position illustrated in FIG. 2, the second wobble arm 61 and the counterweight 7 move in the opposite direction. Finally, the first wobble plate assembly 5 and the spindle 8 driven by it are in their second position, and the second wobble plate assembly 6 and the counterweight 7 driven by it are in their second position. It must be stressed again that the reciprocating movement of the counterweight 7 is a rotational motion.

The swiveling angle of the counterweight 7 going from the first position to the second position, and vice versa, is about 10°.

It will be seen that the second wobble arm 61 is shorter than a conventional wobble arm and also shorter than the first wobble arm 51. Referring to FIG. 2 it will also be seen that the first wobble arm 51 cannot strike the second wobble arm 61 in the second position. Therefore, with reference to FIG. 3, the angle between the first wobble arm 51 and the second wobble arm 61 can be zero, as is seen along the longitudinal axis X of the spindle 8.

Figure 6:
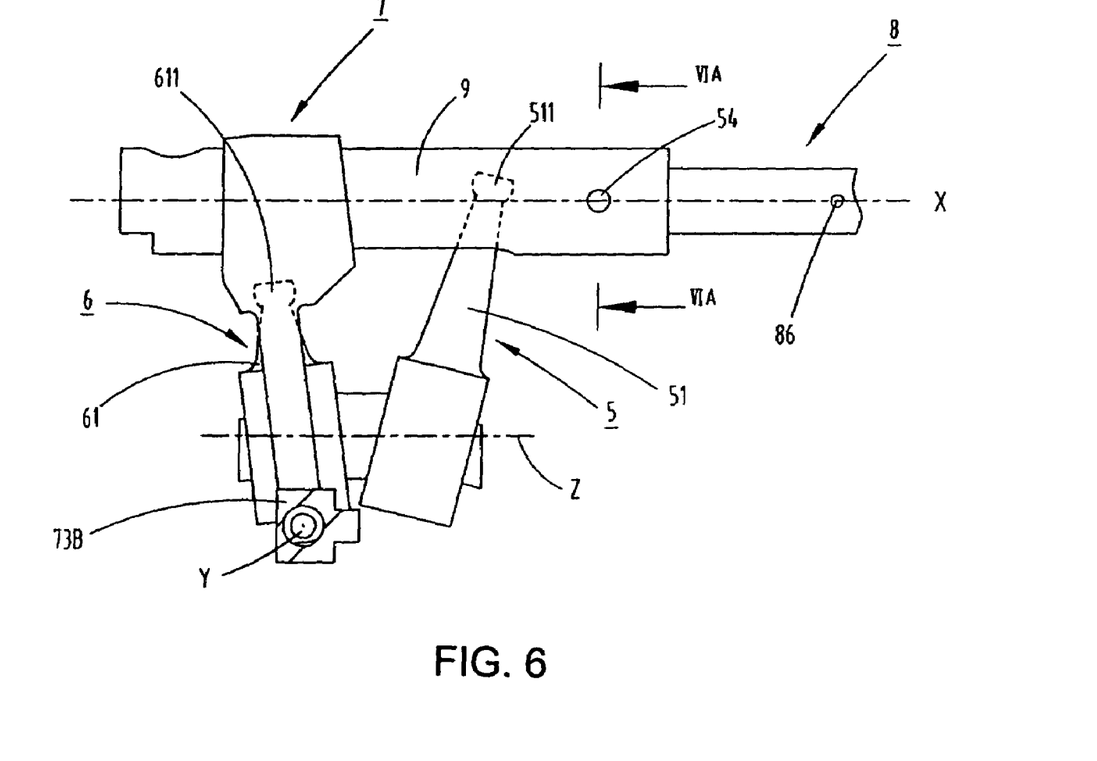
FIG. 6 is a highly-diagrammatic, side-elevational view of the spindle in its first position and the counterweight in its first position.
Figure 6A:
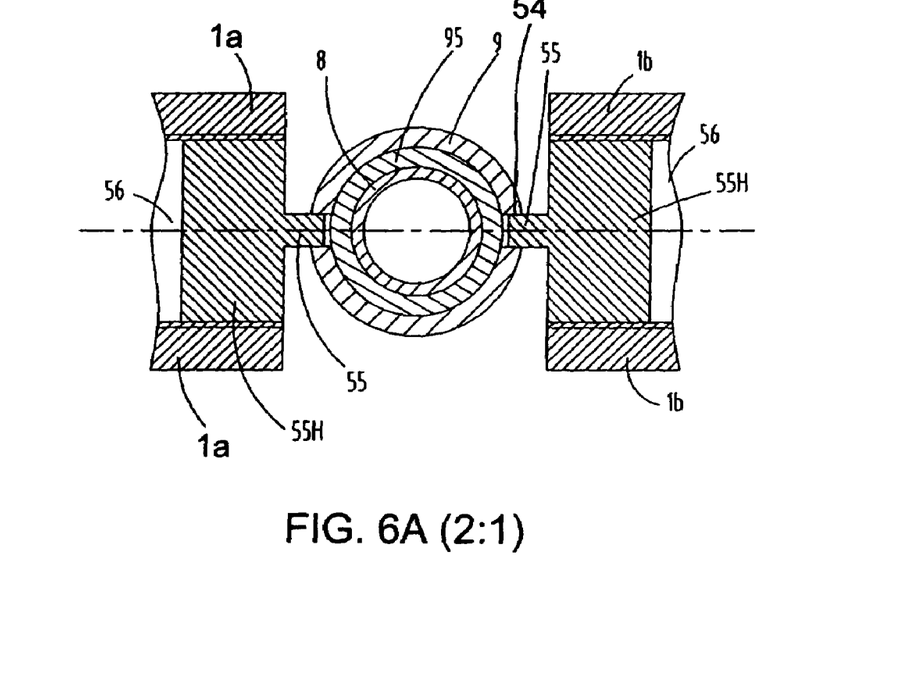
FIG. 6A is a fragmentary, sectional view taken along a line VIA-VIA of FIG. 6, in the direction of the arrows.
Figure 7:
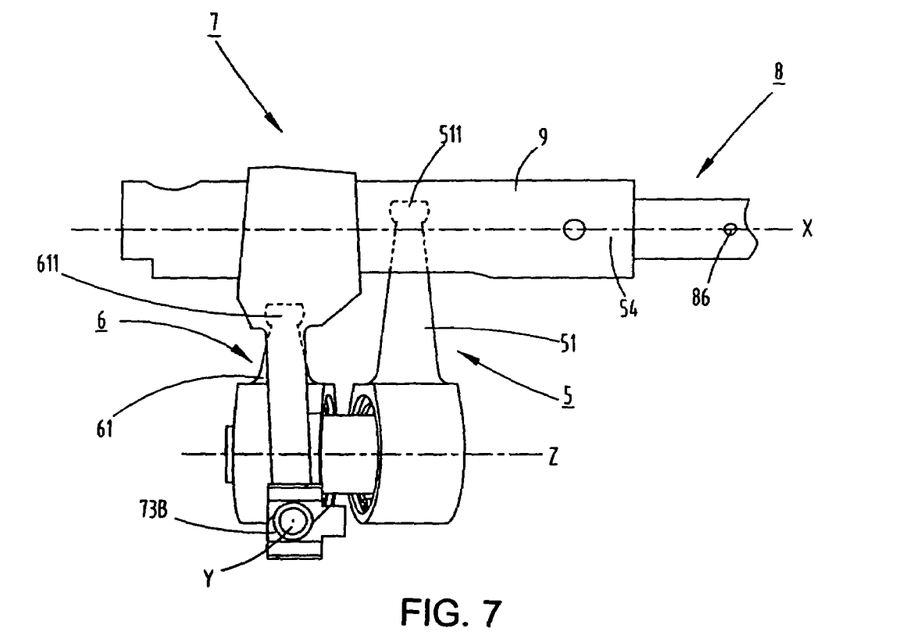
FIG. 7 is a highly-diagrammatic, side-elevational view of the spindle in a position between its first position and its second position and the counterweight in a position between its first position and its second position.
Figure 8:
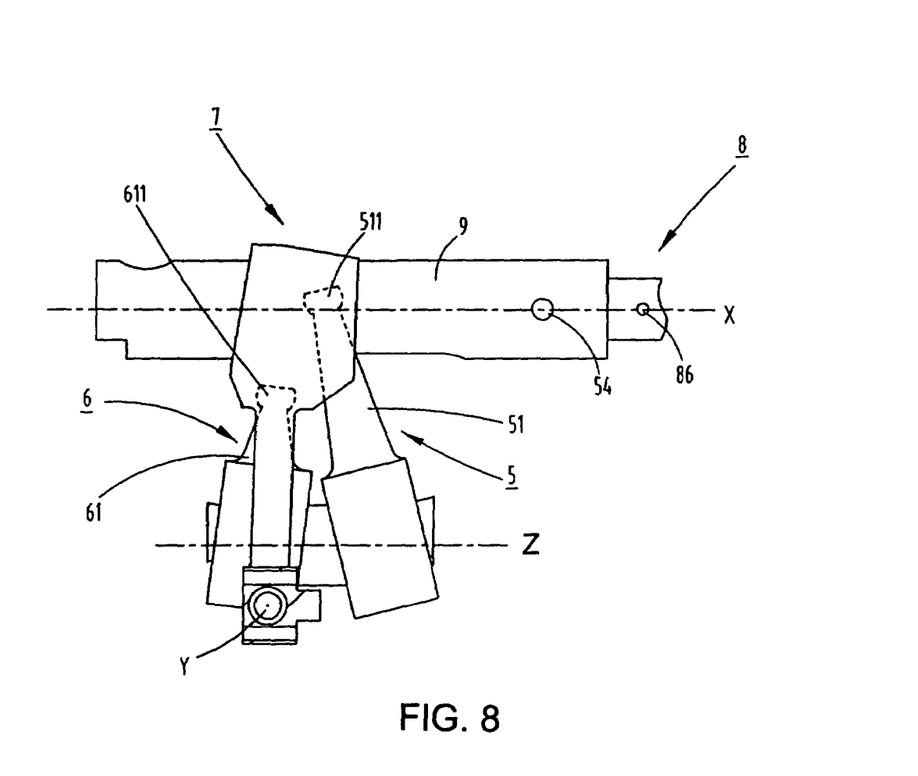
FIG. 8 is a highly-diagrammatic, side-elevational view of the spindle in its second position and the counterweight in its second position.

Referring to the movement sequences shown in FIG. 6, FIG. 7 and FIG. 8, the following will be clear: When the jackshaft 4 driven by the motor 2 rotates half of a revolution, the first wobble plate assembly 5 and the spindle 8 driven by it move from their first position to their second position, and the second wobble plate assembly 6 and the counterweight 7 driven by it move from their first position to their second position. The opposite occurs when the jackshaft 4 rotates in the next half of a revolution.

In order to reduce vibrations when the reciprocating saw operates, a stroke s2 and a weight w2 of the system including the second wobble arm 61 and the counterweight 7 should be proportionate to a stroke s1 and a weight w1 of the entire system including the first wobble arm 51, the spindle 8, the blade 3, and the clamping system 3a. Preferably, the product (s2×w2) should be approximately equal to the product (s1×w1). For instance, if the weight w1 of the entire system 51, 8, 3 and 3a is w1=200 g and the stroke is s1=32 mm, the product is (w1×s1)=0.2 kg×32 mm=6.4 kg mm. Then, in order to balance or compensate for vibrations, the parameters of the counterweight system 7 may be selected in such a way that it has a weight w2=0.4 kg and a stroke s2 of the center of the mass s2=16 mm, so that the product will be w2×s2=0.4 kg×16 mm=6.4 kg mm.

It was already mentioned that the counterweight 7 is pivotally connected with the housing 1 (rotation about pins 73, 74), and that the guide sleeve 9 is received in the U-shaped mass body 71 of the counterweight 7. This permits the counterweight 7 to reciprocate relative to the guide sleeve 9 which represents a simple movement. There is no friction with a large stoke and a large area, and the counterweight 7 does not impede the guide sleeve 9. Therefore, the movement of the counterweight 7 and the spindle 8 improve the system's stability. The generation of heat is also relatively small, since linear sliding of the counterweight on a sleeve, which is used in the prior art, is avoided.

I claim:

1. A power tool, comprising:
   a housing;
   a rotary motor disposed in said housing;
   a jackshaft coupled to said rotary motor;
   a spindle mounted in said housing for carrying a working member;
   a first wobble plate assembly mounted on or coupled to said jackshaft for driving said spindle to reciprocate at least approximately linearly in a linear path along a predetermined axis;
   a counterweight mounted in said housing for performing a reciprocating motion relative to said housing, said counterweight being pivotable relative to said housing about a pivot axis, to perform said reciprocating motion as a rotative reciprocating motion, said pivot axis disposed in a plane perpendicular to said predetermined axis and fixed relative to said housing; and
   a second wobble plate assembly mounted on or coupled to said jackshaft for driving said counterweight, said second wobble plate assembly having a second wobble arm, and said counterweight being pivotally mounted on a first transverse pin and on a second transverse pin, permitting said second wobble arm to drive said counterweight to pivotally rotate relative to said housing about said pivot axis.

2. The power tool according to claim 1, wherein said counterweight pivots about said pivot axis in a pivot path intersecting said linear path of said spindle.

3. The power tool according to claim 1, wherein said spindle has a longitudinal axis, and said counterweight pivots about said pivot axis in a pivot plane parallel to or containing said longitudinal axis of said spindle.

4. The power tool according to claim 1, wherein said spindle has a longitudinal axis, and said pivot axis, about which said counterweight pivots, is substantially perpendicular to said longitudinal axis.

5. The power tool according to claim 1, wherein the power tool is a reciprocating saw.

6. The power tool according to claim 1, which further comprises a guide sleeve, said counterweight including a U-shaped body for axially receiving said guide sleeve, said U-shaped body having a first mass body, a second mass body and a transverse base interconnecting said first mass body and said second mass body.

7. The power tool according to claim 6, wherein said counterweight includes a stirrup extending from said U-shaped body.

8. The power tool according to claim 7, wherein said stirrup has a rectangular shape.

9. The power tool according to claim 7, wherein said pivot axis is defined on said stirrup.

10. The power tool according to claim 6, wherein said second wobble arm has a second tip, and said transverse base has a receiving cavity for receiving said second tip.

11. The power tool according to claim 1, wherein said pivot axis is defined on said counterweight.

12. The power tool according to claim 1, wherein said first pin and said second pin are each received in a respective bearing seat firmly connected to said housing.

13. The power tool according to claim 1, wherein said first wobble plate assembly and said second wobble plate assembly define an angle of zero degrees therebetween, as seen in a longitudinal direction of said jackshaft.

14. The power tool according to claim 1, wherein said first wobble plate assembly has a first wobble arm, and said first wobble arm is longer than said second wobble arm.

15. The power tool according to claim 1, which further comprises a guide sleeve sleeved on said spindle, said guide sleeve being fixed in said housing at least against movement along said predetermined axis.

16. The power tool according to claim 15, which further comprises a pin for swiveling said spindle in a direction substantially perpendicular to said predetermined axis.

17. The power tool according to claim 1, wherein said spindle includes a front component for carrying the working member, and a rear component.

18. The power working member according to claim 17, wherein the tool is a blade.

19. The power tool according to claim 17, wherein said front component is attached to said rear component by a pin.

20. The power tool according to claim 17, which further comprises a guide sleeve having a first axially elongate slot, said rear component having a projection slideably engaged in said first axially elongate slot along a longitudinal axis of said spindle.

21. The power tool according to claim 17, which further comprises a guide sleeve having a second axially elongate slot, said rear component having a socket and a cavity, and said first wobble plate assembly having a first wobble arm passing through said second axially elongate slot and said cavity and being received in said socket.

* * * * *